United States Patent
Han et al.

(10) Patent No.: US 7,586,544 B2
(45) Date of Patent: Sep. 8, 2009

(54) METHOD AND APPARATUS FOR TESTING LIP-SYNC OF DIGITAL TELEVISION RECEIVER

(75) Inventors: Chan-Ho Han, Daegu-si (KR); Jong Sik Kim, Daegu-si (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 10/565,106

(22) PCT Filed: Jul. 1, 2004

(86) PCT No.: PCT/KR2004/001616
§ 371 (c)(1),
(2), (4) Date: Jun. 20, 2006

(87) PCT Pub. No.: WO2005/004470
PCT Pub. Date: Jan. 13, 2005

(65) Prior Publication Data
US 2007/0126929 A1 Jun. 7, 2007

(30) Foreign Application Priority Data
Jul. 1, 2003 (KR) ................... 10-2003-0044233

(51) Int. Cl.
*H04N 17/02* (2006.01)
*H04N 9/475* (2006.01)

(52) U.S. Cl. ..................... 348/515; 348/191
(58) Field of Classification Search ............. 348/515, 348/518, 484, 194
See application file for complete search history.

(56) References Cited

U.S. PATENT DOCUMENTS

| 4,703,355 | A | | 10/1987 | Cooper |
| 4,963,967 | A | * | 10/1990 | Orland et al. ............ 348/484 |
| RE33,535 | E | * | 2/1991 | Cooper ...................... 348/512 |
| 5,596,364 | A | | 1/1997 | Wolf et al. |
| 5,642,171 | A | | 6/1997 | Baumgartner et al. |
| 5,844,600 | A | | 12/1998 | Kerr |
| 6,414,960 | B1 | | 7/2002 | Kuhn et al. |
| 2003/0112249 | A1 | | 6/2003 | Cheng |

FOREIGN PATENT DOCUMENTS

| EP | 0604035 A2 | 6/1999 |
| JP | 15046901 A | 2/2003 |
| WO | WO-99/35824 A1 | 7/1999 |

* cited by examiner

*Primary Examiner*—M. Lee
(74) *Attorney, Agent, or Firm*—Birch, Stewart, Kolasch & Birch, LLP (57) ABSTRACT

A lip synchronization test method for DTV receivers. The method includes the steps of: generating a digital audio stream having a frame index inserted therein and a video stream having a Transient Effect Area Test Signal (TATS) inserted therein; comparing the waveform of the time-indexed audio signal with that of the time-indexed video signal; and measuring and calculating a time difference $d_t$ between the audio and video signals based upon the time indexes of the time-indexed audio and video signals.

17 Claims, 5 Drawing Sheets

Filed Index = 0 2 1 3 ₄ = 39th field = Bottom field of 19th frame

METHOD AND APPARATUS FOR TESTING LIP-SYNC OF DIGITAL TELEVISION RECEIVER

TECHNICAL FIELD

The present invention relates to lip synchronization test method and apparatus for a Digital TV (DTV) receivers based upon time-indexed audio and video signals.

In particular, the present invention relates to lip synchronization test method and apparatus capable of simply testing a regeneration time difference between audio and video signals of a DTV receiver based upon a video signal having Transient Effect Area Test Signals (TATS) inserted therein and an additional audio sub-channel signal having a frame index signal inserted therein.

BACKGROUND ART

A digital broadcasting system executes entire processes based upon digital signals, and therefore can realize clear images and high sound quality by subdividing low-to-high tone sound signals. Accordingly, the application of the digital broadcasting system is getting spread rapidly and widely through various media such as terrestrial, satellite and cable TVs.

A test may be executed on the function and performance of a DTV receiver, which receives from the DTV broadcasting system, by using a signal from the broadcasting system. However, although an operational test may be executed based upon the signal from an actual broadcasting system, the DTV broadcasting system does not provide any signal by which a special function of the receiver can be tested or the performance of the receiver can be maintained steady. As a consequence, a developer or manufacturer of DTV receivers typically establishes an imaginary broadcasting system in order to test the function and performance of a DTV receiver via the imaginary broadcasting system.

Figure 1:
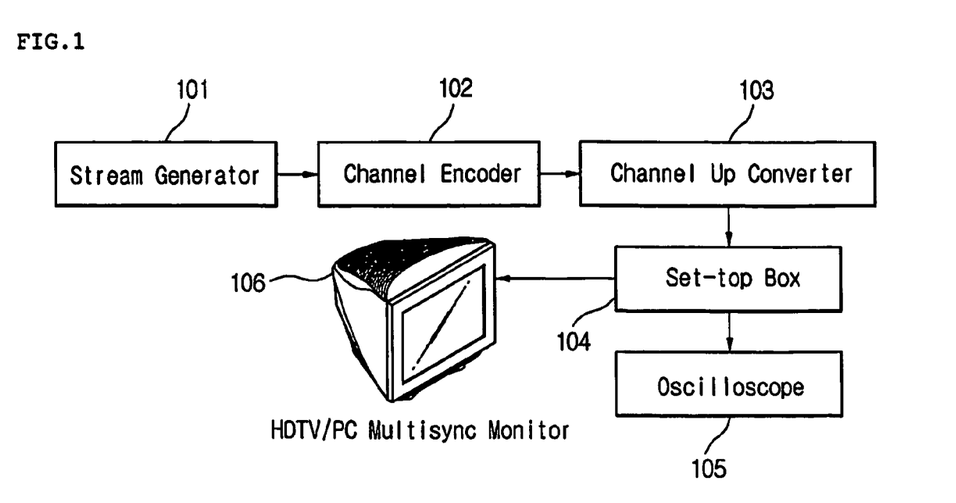
FIG. 1 illustrates an imaginary broadcasting system for a DTV receiver test.

FIG. 1 schematically illustrates a concept of a DTV test via an imaginary broadcasting system. A stream generator 101 generates an audio/video test stream to be used in a test on the function or performance of a DTV receiver, a channel encoder 102 executes channel-encoding to the test stream, a channel up-converter 103 modulates and up-coverts the channel-encoded test stream into an RF level and then outputs the up-converted test stream in the form of an RF signal, and a DTV receiver or set-top box 104 receives the RF signal. Then, a measuring instrument 105 such as an oscilloscope 105 or an HDTV/PC monitor 106 is used to execute a test to the function or performance of the DTV receiver based upon the received test stream.

The length of the test stream used in the manufacture of the DTV receiver as above must be extended infinite as in an actual broadcasting. Also very wide types of test streams are needed for the function or performance test of the DTV receiver. This in turn generates a large number of channels together with enormous data. However, since a computer storage media for storing the DTV test stream has a limited capacity, stream length is minimized and a limited length of stream is repeatedly generated. In case that the limited length of test stream is repeatedly generated, it is required to correctly synchronize the generation time of a video or audio element stream (ES) with that of a transport stream (TS). That is, when the test stream is repeatedly generated, any inconsistency between the TS and the ES may induce audio or video discontinuity, which in turn may cause a DTV receiver to be misconceived defective even though it had passed a quality test in a manufacturing site. As a consequence, means for synchronize the ES with the TS have been needed in the art.

Further, when a DTV receiver decodes a received audio/video resource constituted of a digital video stream and then outputs (i.e., outputs sound and displays a video image) through audio/video processing, any time difference may occur between audio and video signals thereby mismatching the video image and the sound. The mismatched sound and image may dissatisfy a user who watches a DTV set.

Such a process of synchronizing the audio signal with the video signal is referred to as "lip synchronization." Occasionally, means for executing lip synchronization (e.g., hardware and/or software) may be provided inside the DTV receiver. As a well-known technique for enabling the lip synchronization, the DTV receiver uses the time information of the audio/video signals. The technique counts the time information of the audio/video signals to find whether an audio frame proceeds in advance of or behind a video frame, and if a time difference between the audio and video signals exceeding a reference time interval is found at a specific time point, discards or repeats an audio frame at that time point, thereby executing the lip synchronization.

However, even though a lip synchronization control function is mounted, a manufactured DTV receiver is subject to a test with the foregoing test equipment in order to inspect whether audio and video streams of the DTV receiver are consistent with each other. The lip synchronization is a factor to be regarded essential in a DTV system, and tested by measuring a time difference between the audio and video signals in the DTV receiver.

For example, where the time difference between the audio and video signals is in the range from 25 msec to 40 msec, that is, the audio signal proceeds in advance of the video signal within 25 msec or behind the video signal for at least 40 msec. Then, regenerated image and sound appear matching each other in this range, thereby providing more natural image and sound to the audience.

Conventionally, in order to measure a time difference between audio and video signals in a DTV receiver, a lip synchronization test is executed by using a video sequence and an audio signal, which are specifically constructed. That is, the video signal consists of a black part, a white part and a short line part. Then, a lip synchronization test is executed by inserting a signal for video signal synchronization into the short line part, and using a tone signal, which exponentially decreases at a synchronization position, as an audio test signal.

However, this method has a problem in that a video sequence and an audio sequence must have specific constructions dedicated for the lip synchronization test. Therefore, the lip synchronization test for manufactured DTV receivers require additional devices and techniques, thereby causing inconvenient test operation and poor productivity.

DISCLOSURE OF THE INVENTION

An object of the present invention is to provide lip synchronization test method and system for a Digital TV (DTV) receivers based upon time-indexed audio and video signals.

In particular, the present invention is aimed to provide lip synchronization test method and system for DTV receivers capable of simply executing a lip synchronization test on DTV receivers by inserting time index signals into video and audio signals and then measuring the waveforms of the time-indexed audio and video signals with a measuring device such as an oscilloscope.

Another object of the present invention is to provide lip synchronization test method and system for DTV receivers capable of simply executing a lip synchronization test by inserting time-indexed signals into video and audio signals and then calculating an audio/video time difference based upon a time difference measured with a measuring device such as an oscilloscope and field/frame numbers obtained from the time indexes.

Still another object of the present invention is to provide lip synchronization test method and system for DTV receivers capable of simply executing a lip synchronization test by preparing audio and video resources, inserting frame index signals and Transient Effect Area Test Signals (TATS) into audio and video signals, respectively, compressing the frame index signals and the TATS into digital bit streams, decoding the digital audio and video streams in a DTV receiver, and then measuring the waveforms of the decoded digital audio and video streams with a device such as an oscilloscope.

According to an aspect of the present invention for realizing the objects, there is provided a lip synchronization test method for DTV receivers, the method comprising the steps of: generating a digital audio stream having a frame index inserted therein and a video stream having TATS inserted therein; comparing the waveform of the time-indexed audio signal with that of the time-indexed video signal; and measuring and calculating a time difference $d_t$ between the audio and video signals based upon the time indexes of the time-indexed audio and video signals.

According to another aspect of the present invention for realizing the objects, there is provided a lip synchronization test method of DTV receivers, the method comprising the steps of: generating digital audio and video streams each having a time index inserted therein; comparing the waveform of the time-indexed audio signal with that of the time-indexed video signal; and measuring and calculating a time difference $d_t$ between the audio and video signals based upon the time indexes of the time-indexed audio and video signals.

According to still another aspect of the present invention for realizing the objects, there is provided a lip synchronization test system for Digital TV (DTV) receivers comprising: means for detecting a time index signal contained in an audio signal to discriminate a corresponding audio frame number, and calculating a corresponding audio frame time $t_a$ from the audio frame number; means for detecting a time index signal contained in the video signal to discriminate a corresponding video field number and calculating a corresponding video field time $t_v$ from the video field number; means for measuring a time difference between the audio and video signals; and means for calculating a lip synchronization time $d_t$ based upon the time difference between the audio and video signals, the corresponding audio frame time and the video field time.

BEST MODE FOR CARRYING OUT THE INVENTION

Hereinafter an embodiment of a lip synchronization test method according to the present invention will be described with reference to the accompanying drawings.

Figure 2:
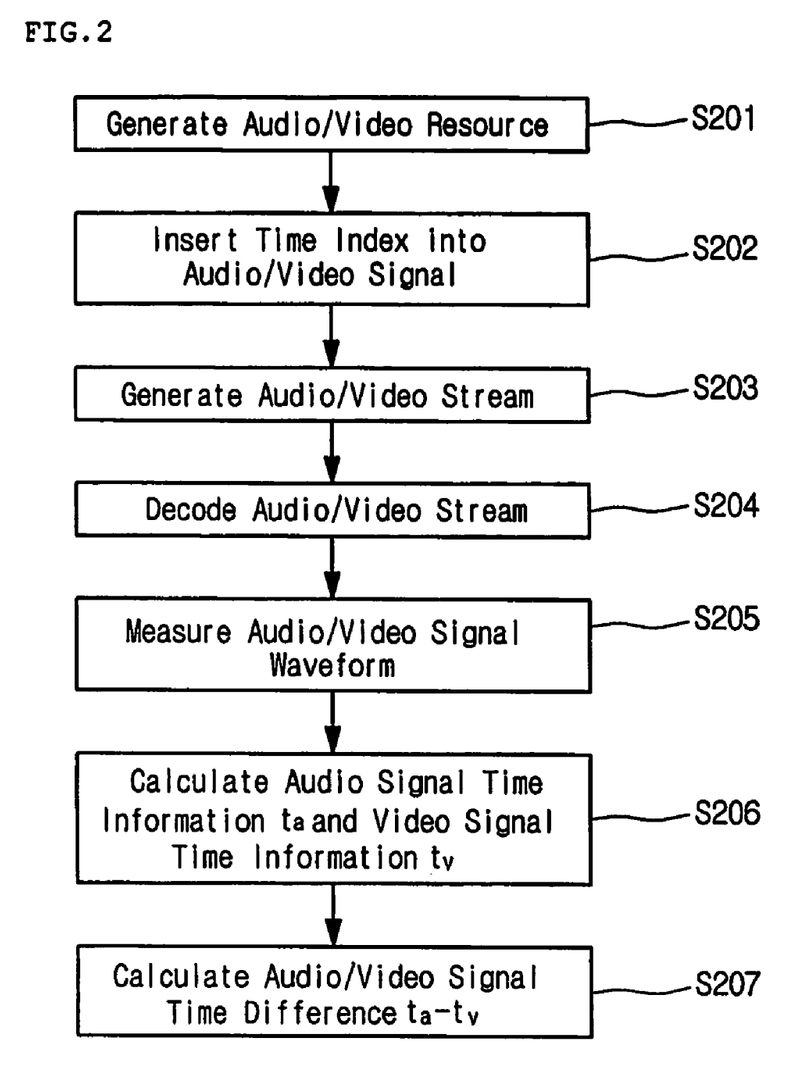
FIG. 2 is a flowchart of a DTV lip synchronization test method according to the present invention.

FIG. 2 is a flowchart of a DTV lip synchronization test method according to the present invention.

Audio and video resource generation step S201 regenerates audio and video signals. Through computer simulation, the audio signal creates an additional audio sub-channel, and the video signal creates a video pattern to be tested.

Figure 4:
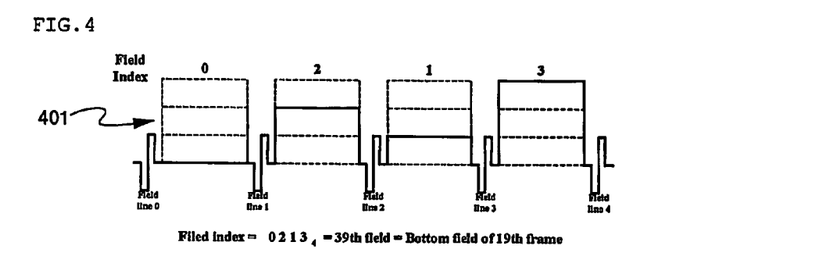
FIG. 4 illustrates a TATS structure according to the present invention.
Figure 5:
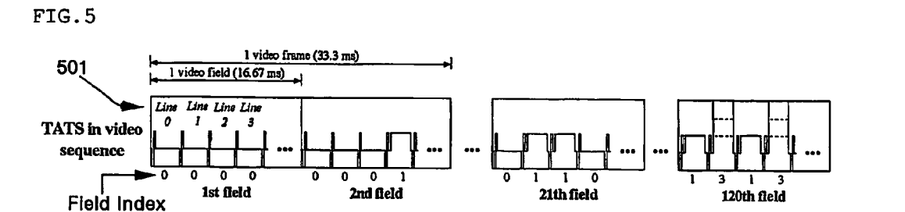
FIG. 5 illustrates a video sequence structure including TATS according to the present invention.

Time index inserting step S202 inserts frame indexes into the audio signal to form a time-indexed audio signal (refer to FIG. 6), and inserts field indexes into the video signal to form a time-indexed vide signal (refer to FIGS. 4 and 5). The structures of the time-indexed audio and video signals will be described later in more detail with reference to FIGS. 4 to 8.

Next, Audio an video stream generation step S203 compresses the time-indexed audio and video signals to generate audio and video streams. Finally, the audio and video streams are multiplexed with an instrument such as an MPEG analyzer to form a transport stream.

The audio and video streams generated as above are inputted into a DTV receiver to be tested, and then decoded in an audio and video decoding step S204.

The audio/video decoding is executed according to a well-known technique of the art. That is, the DTV receiver receives and parses the transport stream, separately decodes the transport stream into audio and video signals, and then outputs sound and a video image by processing the audio and video signals.

Audio and video signal waveform measuring step S205 captures and measures the waveforms of the decoded audio and video signals with a measuring device such as an oscilloscope. This measuring step S205 obtains a time difference $t_{dav}$ between the audio and video signals.

Audio and video signal information calculating step S206 calculates an audio time $t_a$ and a video time $t_v$ based upon the time index information (waveforms) of the time-indexed audio and video signals. As will be described later in detail, the audio time $t_a$ is obtained by calculating an audio frame number n from the time index information of the audio signal waveform and then calculating the audio frame number n with an audio frame time, and the video time $t_v$ is obtained by calculating a video field number m corresponding to the audio frame number with a video field rate field/sec.

Next, audio and video time difference calculating step S207 calculates a final lip synchronization time $d_t$ based upon the audio and video times, a time difference $t_a-t_v$ between the audio and video times and an initial value $t_{DTSoffset}$ of a Decoding Time Stamp (DTS). The DTS is used for decoding time information in a video Packetized Elementary Stream (PES) packet, and indicates a time value during which compressed video and audio streams are transmitted from a system decoder to an ES decoder.

The initial value of the DTS has an initial delay time in order to maintain the fullness of a buffer at a constant value. Since the video signal requires a larger buffer size, the video signal has a longer restoration time than the audio signal and thus has a delay time of about 0.2 sec.

Of course, the initial value of the DTS can be varied according to stream transmission rate, frame rate, decoder buffer size and so on.

Based upon an $n^{th}$ audio frame time $t_a$, an $m^{th}$ video field time $t_v$, an audio and video time difference $t_{dav}$ measured with a measuring device and a DTS initial value $t_{DTSoffset}$, the audio/video time difference $t_{dav}$ may be obtained as $d_t = t_a - t_v - t_{dav} - t_{DTSoffset}$.

As described above, it is possible to execute a lip synchronization test by measuring the waveforms of the time-indexed audio and video signals with the measuring device such as an oscilloscope, and then obtaining the audio and video time difference based upon the measured time index information.

Next, in view of the audio time index, the video time indexes and the measured waveforms which have been described above, an exemplary lip synchronization test method will be described with reference to FIGS. 3 to 9.

Figure 3:
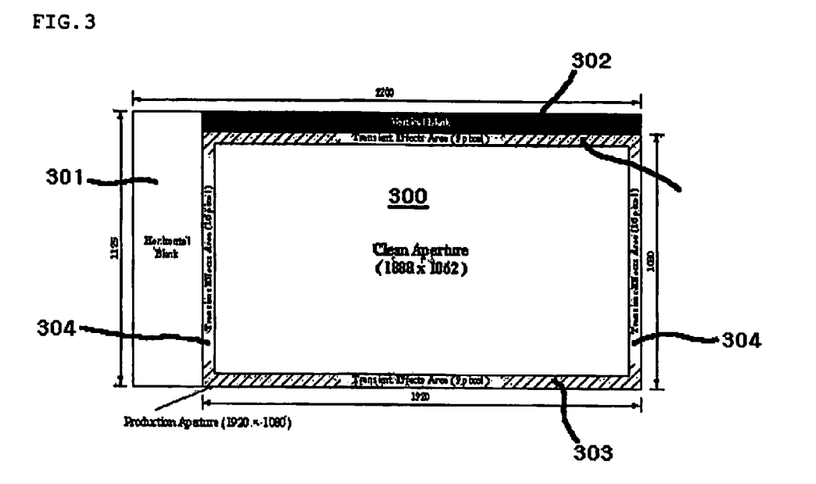
FIG. 3 schematically illustrates a DTV picture format adopted in the present invention.

First, FIG. 3 schematically illustrates a 1920×1080 picture format. In this format, a display aperture 300 has a 1888×1062 size. A horizontal blank 301 is located in the left of the display aperture 300, a vertical blank 302 is located above the display aperture 300, Transparent Effect Areas (TAs) 303 (of 9 pixels) adjoin the top and bottom edges of the display aperture 300, and TAs 304 of 16 pixels adjoin the right and left edges of the display aperture 300.

According to the present invention, Transient Effect Area Test Signals (TATS) are inserted into the vertical TAs in every video frame to insert indexes about corresponding fields like Vertical Interval Test Signals (VITS) in an analogue TV system. That is, the TATS are inserted into first 8 lines of the video frame, in which the TATS have different values according to respective fields in order to express field/frame indexes.

FIG. 4 schematically illustrates the TATS. As shown in FIG. 4, video time indexes in the present invention are adapted to index corresponding video field numbers based upon 4 levels. That is, the indexing is executed in quadruple digits, in which a field index is expressed with an index waveform 401 having four levels of 0, 1, 2 and 3. Since two fields form one frame in case of an interlace mode, a field index of for example '$0213_4$' as seen in FIG. 4 indicates a $39^{th}$ field and therefore the bottom field of a $19^{th}$ frame.

FIG. 5 illustrates a video sequence 501 including the TATS. As can be seen from FIG. 5, one video frame consists of two video fields, and field indexes are graded in their order based upon 4 levels (quadruple digits) of 0, 1, 2 and 3 beginning from the first field.

Where one video frame is 33.3 msec, one field will correspond to 16.67 msec.

Figure 6:
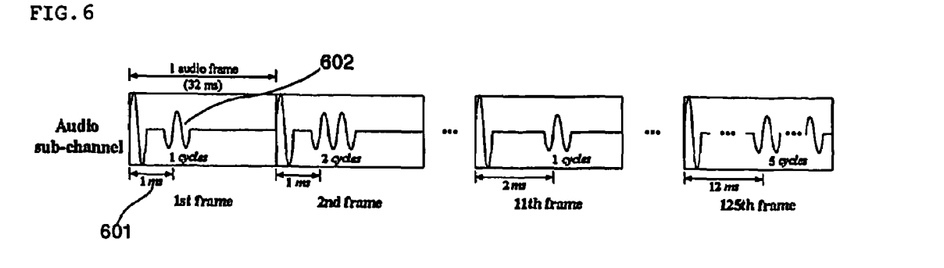
FIG. 6 illustrates an audio signal structure that is frame-indexed for a lip synchronization test according to the present invention.

FIG. 6 illustrates time indexes to be inserted into audio frames according to the present invention. As shown in FIG. 6, an index waveform is inserted into every audio frame for the purpose of frame indexing. That is, the time indexes are expressed as additional audio sub-channels each containing a frame index related with frame number.

In view of the exemplary audio frame time indexes shown in FIG. 6, one frame consists of 32 msec, and an audio frame index signal graded (inserted) into each frame includes time information 601 and the number of signals 602.

For example, a first audio frame has a sinusoidal wave of one cycle inserted therein after 1 msec, and a second audio frame has a sinusoidal wave of two cycles inserted therein after 2 msec.

Accordingly, the relationship between the video and audio time indexes described hereinbefore will be arranged as in Table 1 below.

TABLE 1

| Video field number | TATS (Time index) | Audio frame number | Time index | Number of index signal |
|---|---|---|---|---|
| 1 | 0000 | 1 | 1 msec | 1 cycles |
| 2 | 0001 | 2 | 1 msec | 2 cycles |
| 3 | 0002 | ... | ... | ... |
| 4 | 0003 | | ... | ... |
| 5 | 0010 | 10 | 1 msec | 10 cycles |
| ... | | 11 | 2 msec | 1 cycles |
| 21 | 0110 | 12 | 2 msec | 2 cycles |
| ... | | ... | ... | ... |
| 120 | 1313 | ... | ... | ... |
| ... | | 90 | 9 msec | 10 cycles |
| 164 | 2210 | 91 | 10 msec | 1 cycles |
| ... | | ... | ... | ... |
| 256 | 3333 | 125 | 12 msec | 5 cycles |

Figure 7:
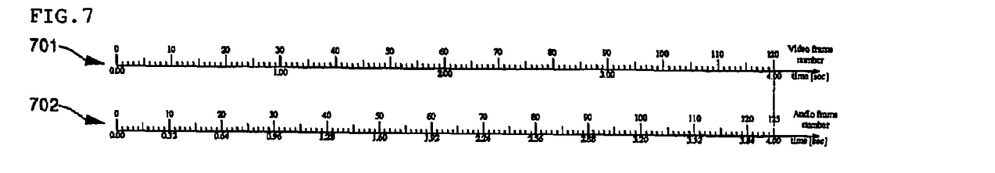
FIG. 7 illustrates the relationship between time-indexed audio and video signals according to the present invention.

The video field and audio frame indexes as above are looped back for a specific time period. For example, as shown in FIG. 7, a video frame number and an audio frame number 702 are looped back every 4 seconds in order to avoid any confusion between adjacent synchronous signals.

Figure 8:
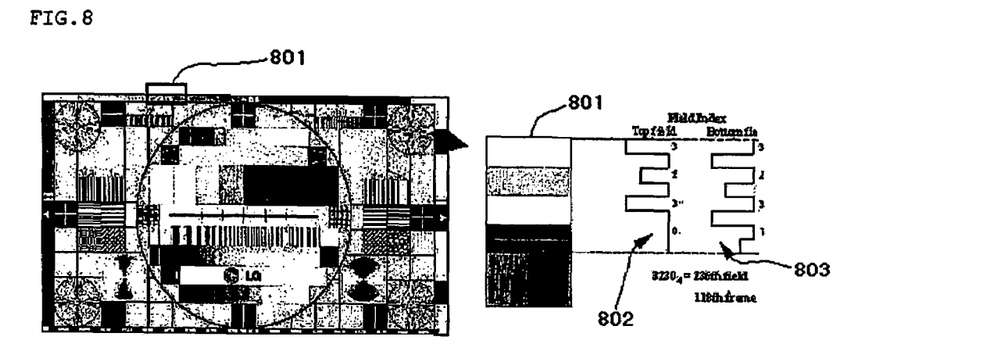
FIG. 8 illustrates an exemplary video frame including TATS according to the present invention.

FIG. 8 illustrates an exemplary video frame having TATS inserted therein according to the present invention. It is to be understood that time indexes, that is, field indexes as described above are inserted into a TA 801. Since it is assumed that one frame is constituted of two fields such as top and bottom fields as described above, the field index is expressed as a top field index 802 and a bottom field index 803. In FIG. 8, since a TATS level in a TA has a value of '$3230_4$' when it is a top field, it is understood that this value means a $236^{th}$ field and therefore expresses a $118^{th}$ frame index.

When the waveforms of time-indexed video and audio signals as reported in Table 1 above are observed with a measuring instrument such as an oscilloscope, an audio time $t_a$ and a video time $t_v$ can be calculated based upon the frame number of audio signals and the field (frame) number of video signals, and respective frame rates or frame times thereof can be calculated from the time indexes. Then, audio and video lip synchronization times can be calculated by using the audio and video times $t_a$ and $t_v$.

Figure 9:
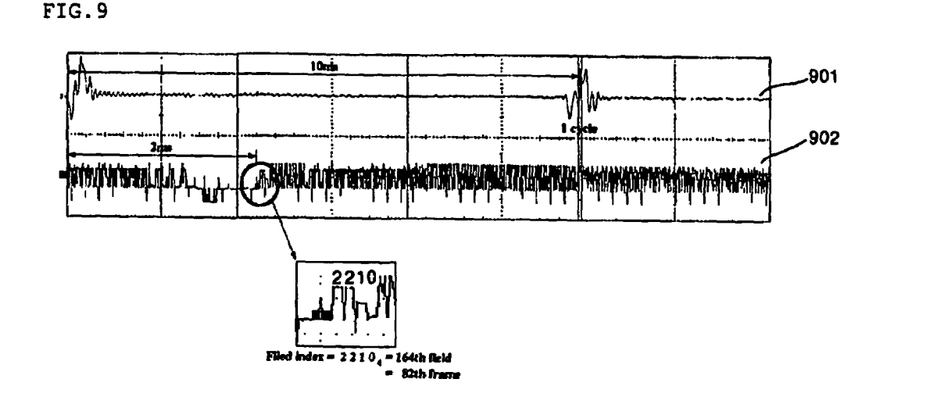
FIG. 9 illustrates exemplary audio and video test waveforms of a DTV receiver for a lip synchronization test according to the present invention.

FIG. 9 illustrates exemplary audio and video test waveforms of a DTV receiver for a lip synchronization test according to the present invention. The waveforms in FIG. 9 are captured measured with an oscilloscope, in which the reference numeral 901 represents an audio signal, and the reference numeral 902 represents a video signal.

Since a sinusoidal wave of one cycle is detected at 10 msec in the audio signal 901, it can be understood that this time index signal indicates a $91^{st}$ audio frame as reported in Table 1 above. Therefore, the time $t_a$ of the $91^{st}$ audio frame is calculated $t_a$=32 (msec/frame)×91(frame)=2.912 sec according to an audio frame time 23 msec.

In addition, a time index (TATS) waveform included in the video signal 902 has a value '$2210_4$', which indicates a $164^{th}$ field, that is, an $82^{nd}$ frame. Therefore, the time $t_v$ of the $164^{th}$ video field is calculated $t_v$=164/60=2.7333 sec according to the field rate 60 field/sec.

Since it can be understood that the time difference $t_{dav}$ measured between the $91^{st}$ audio frame and the $164^{th}$ video field is 2 msec, the lip synchronization time, that is, the time difference between the audio and video signals is calculated $$d_t = t_a - t_v - t_{dav} - t_{DTSoffset} = 2.912 - 2.733 - 0.002 - 0.2 = -0.023 \text{ sec}$$

when a DTS initial value $t_{DTSoffset}$ is set 0.2 sec.

This test result teaches that the audio signal is behind the video signal for 23 msec and therefore within a lip synchronization standard (+25 msec to −40 msec). This means that the corresponding DTV receiver passes the lip synchronization test.

Figure 10:
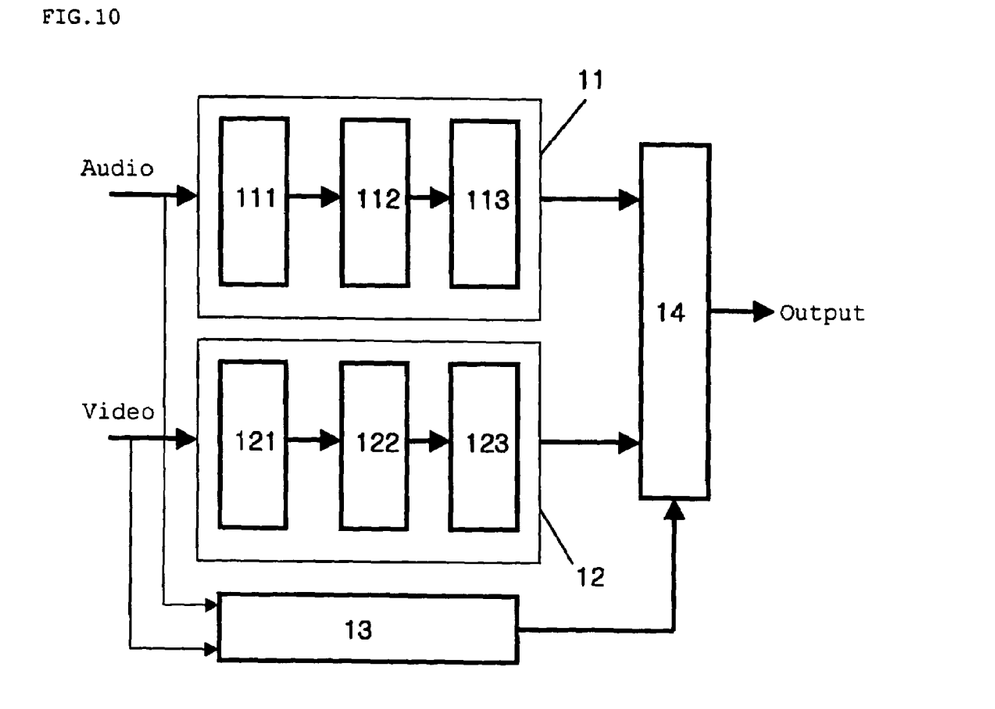
FIG. 10 is a block diagram illustrating the structure of a lip synchronization test system for a DTV receiver according to the present invention.

FIG. 10 illustrates the structure of a lip synchronization test system for DTV receivers according to the present invention, which is designed to automatically execute the lip synchronization test method for DTV receivers as described hereinbefore.

The lip synchronization test system for DTV receivers according to the present invention includes an audio time calculating means 11 for detecting a time index signal contained in an audio signal to discriminate a corresponding audio frame number, and calculating a corresponding audio frame time $t_a$ from the audio frame number; a video time calculating means 12 for detecting a time index signal contained in the video signal to discriminate a corresponding video field number and calculating a corresponding video field time $t_v$ from the video field number; a measuring means 13 for measuring a time difference between the audio and video signals; and a lip synchronization discriminating means 14 for calculating a lip synchronization time $d_t$, based upon the time difference between the audio and video signals, the corresponding audio frame time and the video field time.

The audio time calculating means 11 includes an audio time index detecting means 111 for detecting a time index signal contained in the audio signal, an audio frame number discriminating means 112 for decoding the detected audio time index signal to discriminate the corresponding audio frame number and a calculating means 113 for calculating the discriminated audio frame number with an audio one frame time to calculate the corresponding audio frame time $t_a$.

The video time calculating means 12 includes a video time index detecting means 121 for detecting a time index signal contained in the video signal, a video field number discriminating means 122 for decoding the detected video time index signal to discriminate the corresponding video field number and a calculating means for calculating the discriminated video field number with a video field rate to obtain the corresponding video frame time $t_v$.

The operation of the lip synchronization test system for DTV receivers of the present invention of the above structure will be described as follows.

The audio time index detecting means 111 detects an inserted audio time index signal as shown in FIG. 6 from an input audio signal. The audio time index detecting means 111 detects the audio time index signal that is inserted into each audio sub-channel in the form of a sinusoidal wave, which has n number of cycles and a predetermined time in each audio frame.

The audio frame number discriminating means 112 counts a time period from an initial position of the audio frame until a sinusoidal wave appears and counts the number of detected sinusoidal waves to discriminate a corresponding audio frame. For example, since a sinusoidal wave of one cycle is counted after 10 msec in the waveform shown in FIG. 9, a $91^{st}$ audio frame can be decoded from this value.

By using the decoded audio frame number n and an audio one frame time of for example 32 msec, the calculating means calculates a corresponding audio frame time $t_a$ expressed as $t_a = 32$ msec $\times$ n[sec] as described above, and inputs the calculated audio frame time into the lip synchronization discriminating means 14.

The video time index detecting means 121 detects a video time index signal, which is inserted as shown in FIGS. 4 and 5, from an input audio signal. Since the video time index signal in the form of 4 levels is inserted into each video field, a signal having 4 levels is detected as the video time index signal. Herein, by detecting the video time index corresponding to the audio frame, the lip synchronization time difference can be measured correctly.

The video field number discriminating means 122 decodes the level of the detected video time index signal to discriminate a corresponding video field number. For example, a $164^{th}$ video field ($82^{nd}$ video frame) can be decoded from the value '$2210_4$' in the waveform shown in FIG. 9.

The calculating means 123 calculates a corresponding video field time $t_v = m/60$ [sec] by using the decoded video field number m and a video field rate of for example 60 field/sec, and inputs the calculated video field time into the lip synchronization discriminating means 14.

The measuring means 13 measures a time difference between the audio frame calculated by the audio time calculating means 11 and the video frame calculated by the video time calculating means 12. As an example of a measuring method, the measuring means 13 can count a time (e.g., 2 msec in FIG. 9) from an initial point of an audio frame until detecting a corresponding field index as shown in FIG. 9 in order to measure the audio and video time difference $t_{dav}$.

Based upon the $n^{th}$ audio frame time, the $m^{th}$ video field time corresponding to the $n^{th}$ audio frame time, the detected audio and vide time difference $t_{dav}$ and the DTS initial value $t_{DTSoffset}$, the lip synchronization discriminating means 14 calculates a lip synchronization time $d_t = t_a - t_v - t_{dav} - t_{DTSoffset}$, and outputs a calculated result in the form of numeric values. Alternatively, the lip synchronization discriminating means 14 can judge whether a corresponding DTV receiver is defective or not by comparing the result with a predetermined reference range.

INDUSTRIAL APPLICABILITY

The present invention can very simply execute a lip synchronization test on a DTV receiver by capturing the waveforms of time-indexed audio and video signals to obtain the time information of the audio and video signals and execute the lip synchronization test based upon the measured time difference between the audio and video signals.

Further, the present invention advantageously executes a lip synchronization test by using video TATS and additional audio sub-channels without any additional lip synchronization test program.

In particular, the lip synchronization test method for DTV receivers according to the present invention has an advantage in that a lip synchronization test can be executed on the waveforms of time-indexed audio and video signals regardless of time points when the waveforms of time-indexed audio and video signals are capture.

We claim:

1. A lip synchronization test method for a DTV (digital TV) receivers, the method comprising the steps of:
   generating digital audio and video streams to be used in a test on a DTV receiver, the audio stream having a frame index inserted therein and the video stream having a Transient Effect Area Test Signal (TATS) inserted therein;

discriminating an audio frame number and a video field number based upon time indexes of time-indexed audio and video signals;

calculating an audio frame time $t_a$ and a video field time $t_v$ from the audio frame number and the video field number; and measuring a time difference $d_t$ between the audio and video signals in the DTV receiver using the audio frame time $t_a$ and the video field time $t_v$.

2. The lip synchronization test method according to claim 1, wherein an $n^{th}$ audio frame time $t_a$ measured from a time-indexed audio frame waveform is calculated $t_a$=one audio frame time X n [sec].

3. The lip synchronization test method according to claim 1, wherein an $m^{th}$ video field time $t_v$, measured from a time-indexed video frame waveform is calculated $t_v$=m/field rate (field/sec) [sec].

4. The lip synchronization test method according to claim 1, wherein the audio frame index and the video field index are looped back at a predetermined time period.

5. The lip synchronization test method according to claim 1, wherein the audio and video time difference $d_t$ is expressed as $$d_t = t_a - t_v - t_{dav} - t_{DTSoffset},$$

wherein $t_a$ is an $n^{th}$ audio frame time, $t_v$ is an $m^{th}$ video field time corresponding to the $n^{th}$ audio frame time, $t_{dav}$ is an audio and video time difference measured with a measuring device and $t_{DTSoffset}$ is a Decoding Time Stamp (DTS) initial value.

6. The lip synchronization test method according to claim 1, wherein the audio frame index is formed by inserting a predetermined number of waveforms into the digital audio stream at a predetermined time corresponding to each audio frame.

7. The lip synchronization test method according to claim 1, wherein the Transient Effect Area Test Signal (TATS) of the video signal is formed by inserting a 4-level field index into the digital video stream based upon a line corresponding to a Transparent Effect Area (TA) of each video frame.

8. A lip synchronization test method of Digital TV (DTV) receivers, the method comprising the steps of:

generating digital audio and video streams to be used in a test on a DTV receiver, the audio and video streams each having a time index inserted therein;

discriminating an audio frame number and a video field number based upon the time indexes of the time-indexed audio and video signals;

calculating an audio frame time $t_a$ and a video field time $t_v$ from the audio frame number and the video field number; and measuring a time difference $d_t$ between the audio and video signals in the DTV receiver using the audio frame time $t_a$ and the video field time $t_v$.

9. The lip synchronization test method according to claim 8, wherein the audio and video time difference $d_t$ is expressed as $$d_t = t_a - t_v - t_{dav} - t_{DTSoffset},$$

wherein $t_a$ is an $n^{th}$ audio frame time, $t_v$ is an $m^{th}$ video field time corresponding to the $n^{th}$ audio frame time, $t_{dav}$ is an audio and video time difference measured with a measuring device and $t_{DTSoffset}$ is a Decoding Time Stamp (DTS) initial value.

10. The lip synchronization test method according to claim 8, wherein the time index is inserted into a Transient Effect Area (TA).

11. The lip synchronization test method according to claim 8, wherein the time index of the video signal indexes a video field number.

12. The lip synchronization test method according to claim 8, wherein the time index of the audio signal indexes an audio frame number.

13. The lip synchronization test method according to claim 12, wherein the time-indexed signal of the audio signal includes time information and signal number.

14. A lip synchronization test system for Digital TV (DTV) receivers comprising:

means for detecting a time index signal contained in an audio signal to discriminate a corresponding audio frame number, and calculating a corresponding audio frame time $t_a$ from the audio frame number;

means for detecting a time index signal contained in the video signal to discriminate a corresponding video field number and calculating a corresponding video field time $t_v$ from the video field number;

means for measuring a time difference between the audio and video signals; and means for calculating a lip synchronization time $d_t$ based upon the time difference between the audio and video signals, the corresponding audio frame time and the video field time.

15. The lip synchronization test system according to claim 14, wherein the audio time calculating means include:

audio time index detecting means for detecting a time index signal contained in the audio signal;

audio frame number discriminating means for decoding the detected audio time index signal to discriminate the corresponding audio frame number; and calculating means for calculating the discriminated audio frame number with an audio one frame time to calculate the corresponding audio frame time $t_a$.

16. The lip synchronization test system according to claim 14, wherein the video time calculating means include:

a video time index detecting means for detecting a time index signal contained in the video signal;

a video field number discriminating means for decoding the detected video time index signal to discriminate the corresponding video field number; and a calculating means for calculating the discriminated video field number with a video field rate to obtain the corresponding video frame time $t_v$.

17. The lip synchronization test system according to claim 14, wherein the lip synchronization time calculating means calculates the audio and video time difference $d_t$ expressed as $$d_t = t_a - t_v - t_{dav} - t_{DTSoffset},$$

wherein $t_a$ is an $n^{th}$ audio frame time, $t_v$ is an $m^{th}$ video field time corresponding to the $n^{th}$ audio frame time, $t_{dav}$ is an audio and video time difference measured with a measuring device and $t_{DTSoffset}$ is a Decoding Time Stamp (DTS) initial value.

* * * * *